June 5, 1923.

W. W. WORCESTER

RAT TRAP

Filed March 24, 1922

1,457,953

Patented June 5, 1923.

1,457,953

UNITED STATES PATENT OFFICE.

WILLIAM W. WORCESTER, OF BALTIMORE, MARYLAND.

RAT TRAP.

Application filed March 24, 1922. Serial No. 546,310.

*To all whom it may concern:*

Be it known that I, WILLIAM W. WORCESTER, a citizen of the United States, residing at Baltimore city, State of Maryland, have invented certain new and useful Improvements in Rat Traps, of which the following is a specification.

This invention relates to traps for rats and other animals, and its object is to increase the efficiency of the trap, this being attained by the device to be described in detail hereinafter.

Figure 1:
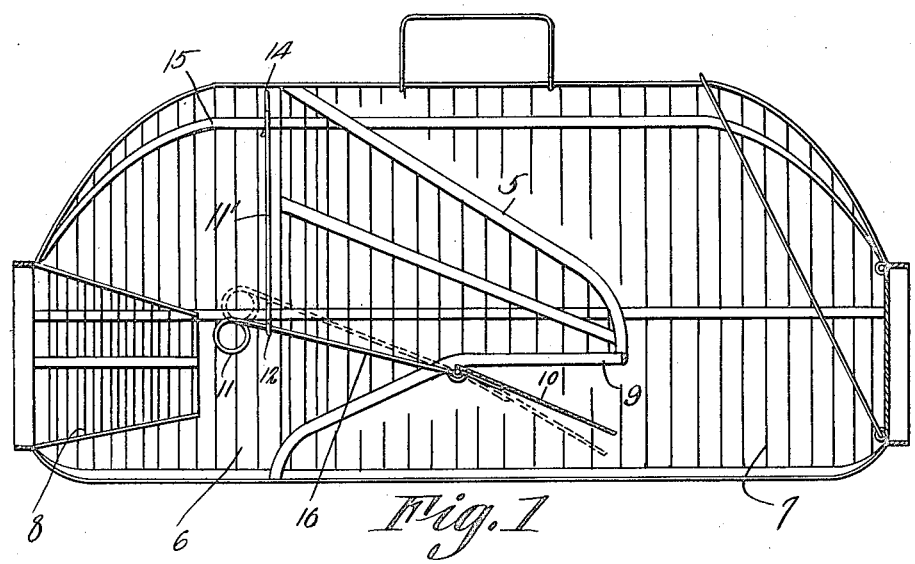
Figure 2:
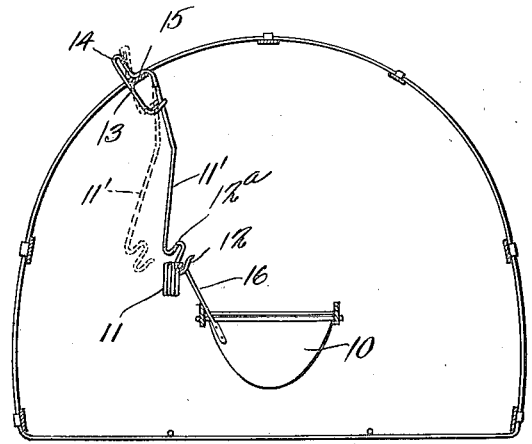
Figure 3:
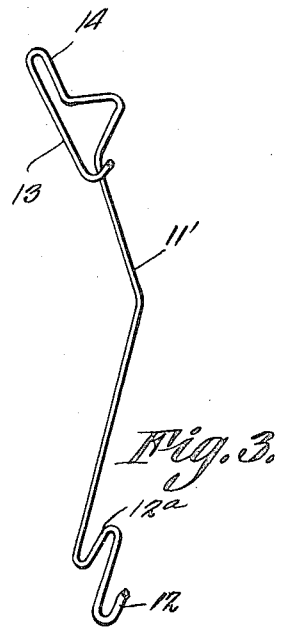

In order that the invention may be better understood, reference is had to the accompanying drawing, wherein:

Figure 1 is a central longitudinal section of a trap showing the application of the invention thereto; Fig. 2 is a cross-section thereof, and Fig. 3 is a perspective view of the invention detached.

Referring specifically to the drawing, the trap is constructed mainly of wire and it consists of an open-work enclosure which is divided by means of a partition 5 into two separate chambers 6 and 7, respectively, the former being an entrance chamber, and the latter a victim-receiving chamber. The chamber 6 has the usual funnel-shaped inlet 8 through which the animals enter. The partition 5 has an escape opening 9 through which the animal in the chamber 6 can escape into the chamber 7. The opening 9 is provided with a closure 10 in the nature of a tiltable gate which opens downwardly, and is counterweighted, as shown at 11, so that it has a normal tendency to closed position. Thus far described, the trap is one of well-known design, and hence a further description thereof is not necessary.

In a trap of the type described, the gate 10 is normally completely closed, so that the rat or other animal entering the chamber 6 through the funnel-like inlet 8 cannot escape from said chamber into the chamber 7 until it steps on the closed gate 10, whereupon said gate tilts downwardly to open position, and the animal is precipitated into the chamber 7, and as soon as the gate is relieved of the weight of the animal, it swings back to closed position, so that the trap is now reset for the next victim.

In a trap constructed and operating in the manner hereinbefore described, the first animal entering the same usually does not readily find its way into the chamber 7, due to the fact that the gate 10 is completely closed. However, after the first animal is trapped in the chamber 7, the animal next entering the chamber 6 has no difficulty in getting into the chamber 7, it being attracted by the animal already in said chamber. In order to correct this defect, a means has been provided for holding the gate 10 partly open when the trap is initially set, the gate being so held until the first animal passes into the chamber 7, after which the gate swings to completely closed position, and remains in this position except when it opens to admit the next victims to the chamber 7. The means whereby this operation is effected comprises a pivoted latch device in the form of a wire rod 11' having at one end a hook 12, and a loop 13 at its other end, said loop being formed with a finger-piece 14. The latch device is mounted in place by slipping the loop 13 over one of the longitudinal bars 15 of the open-work structure forming the wall of the trap. The device is located in the chamber 6, and its hook 12 is placed under an arm 16 extending rearwardly from the gate 10, said arm carrying the counterweight 11. The device can be readily engaged with the arm 16 as the finger-piece 14 is located outside the chamber 6. The latch device is loosely hung from the bar 15, and when its hook 12 is engaged with the gate arm 16 it must be swung over sidewise from its normal pendent position. The latch device is now unbalanced, and it will therefore be evident that when the gate 10 is tilted by the first animal stepping on the same, the arm 16 swings out of the hook 12, whereupon the device is free to swing sidewise to the dotted line position shown in Fig. 2, in which position it is clear of the arm 16 so as not to interfere with the subsequent swings of the gate to completely closed position.

The latch device hereinbefore described is very simple in construction, it being made of a single piece of wire. The device can also be readily applied to any trap of the kind described without any changes in the structure thereof. A second hook 12$^a$ is provided so that the partly open position in which the gate is initially held may be varied according to the extent of movement of the gate to fully open position.

I claim:

1. The combination with a trap having entrance and victim-receiving chambers, and a tiltable victim-operated gate establishing communication between said chambers; of a means for initially holding said gate in open position, said means operating to permit complete closure of the gate after the passage of the first victim into the victim-receiving chamber, and such closed position of the gate being thereafter its normal position.

2. The combination with a trap having entrance and victim-receiving chambers, and a tiltable victim-operated gate establishing communication between said chambers; of a latch for holding the gate open, said latch being disengaged and assuming an inoperative position after the initial operation of the gate.

3. The combination with a trap having entrance and victim-receiving chambers, and a tiltable victim-operated gate establishing communication between said chambers; of a latch for holding the gate open, said latch being disengaged and assuming an inoperative position after the initial operation of the gate, and said gate after such initial operation having a normally closed position.

4. The combination with a trap having entrance and victim-receiving chambers, and a tiltable victim-operated gate establishing communication between said chambers; of a latch detachably engageable with the gate for holding the same open, said latch being pivotally hung and having an unbalanced position when in gate-holding position to swing to inoperative position upon the initial operation of the gate.

5. The combination with a trap having entrance and victim-receiving chambers, and a tiltable victim-operated gate establishing communication between said chambers; of a latch detachably engageable with the gate for holding the same open, said latch being pivotally hung and having an unbalanced position when in gate-holding position to swing to inoperative position upon the initial operation of the gate, and said gate after such initial operation having a normally closed position.

In testimony whereof I affix my signature.

WILLIAM W. WORCESTER.